INVENTOR:
LOUIS DOYEN

United States Patent Office 2,963,840
Patented Dec. 13, 1960

2,963,840

MACHINE FOR PACKAGING LIQUID PRODUCTS INSIDE COVERS OF PLASTIC MATERIALS

Louis Doyen, Lyon, France, assignor to Leon Doyen, and Louis Doyen, and Vitherm, Lyon, France, a company of France Filed June 5, 1959, Ser. No. 818,340

Claims priority, application France Feb. 26, 1959

8 Claims. (Cl. 53—180)

My invention has for its object a machine for the packaging of liquid products inside covers of plastic material of the type constituted by bags or containers opening into successive points of a sheath or channel rigid therewith. Said machine allows packaging automatically any desired liquid in such packages, which are generally termed "bunch-shaped packages," without any welding of the individual packages for closing same being executed over the actual liquid while it is possible to adjust as required the amount of liquid contained in each bag.

Said machine includes chiefly to this end a stationary nozzle serving as a slideway over which is slidingly fitted a packaging channel which is rigid with the individual bags and assumes an intermittent translational movement so as to pass in succession between the two jaws of a clamping device located on the upstream side of the nozzle, between two carrier members and lastly between two members cutting the channel longitudinally, the welding electrodes closing each bag being located immediately to the front of the point at which the successive bags are filled through the nozzle while the members cutting off said bags across their closed welded closure areas are located to the front of said electrodes.

The operation of said machine is automatic and intermittent, the channel and the associated bags being intermittently stationary during the filling of a bag, the closing of the precedingly filled bag and the cutting off of the bag ahead of the last-mentioned bag, said channel thereafter moving for a predetermined distance so as to allow the progression of the bags from one station forming part of the machine to the next.

In all cases, my invention will be properly understood while its advantages and features will appear clearly from the following description, reference being made to the accompanying diagrammatic drawings illustrating by way of example and by no means in a limiting sense a preferred embodiment of said machine. In said drawings.

Figure 1:
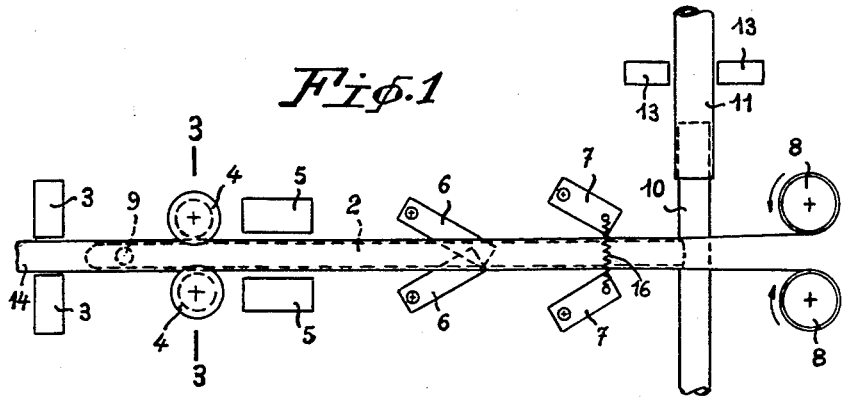
Figs. 1 and 2 are respectively a view from above and a side view of the machine.

Said machine includes chiefly a nozzle 2, clamping means 3, carrier rollers 4, welding electrodes 5, two cutting systems 6 and 7 and a channel-receiving system 8. The nozzle is provided near its outer free end with a downwardly directed opening 9 and it is connected through its other rear end with a tube 10 at right angles with reference to the nozzle, which tube serves both for carrying the nozzle and for feeding same with a liquid product.

The liquid product is fed under pressure and during an adjustable period through the agency of a pneumatic jack or of an electromagnet, as controlled by a time switch. The very simple feeding system illustrated includes a connection between the feeding tube 10 and a tube of yielding material 11 connected in its turn with a pressurized container (not shown) containing a supply of the liquid to be packaged. A clip 13 located to either side of the yielding pipe 12 and controlled by the above-mentioned time-switch allows opening and closing alternatingly the line feeding the nozzle 2 with the liquid to be packaged.

Another feeding system consists in synchronizing with the machine a lift and force pump, which arrangement shows the advantage of cutting out the container under load but requires, in contradistinction, the provision of a pump of a special type, say of vinyl chloride, when it is desired to package products such as bleaching water.

The channel 14 and the bags 15 are supplied by any suitable means, for instance by a spool over which said channel and bags are wound, the spool being supported on a container inside which they are folded accordionwise. In all cases, the channel and its bags are supplied advantageously to the machine over guides of plastic material.

Before the channel 14 engages the nozzle 2, it passes between the two jaws of a clip 3, the closing of which is synchronized with that of the clip carrying the welding electrodes 5 providing for the closing of the bags. The object of the clip 3 is to prevent the liquid fed into the nozzle 2 for the filling of a bag 15 from progressing further inside the channel 14 and filling thus simultaneously several bags.

After passing between the jaws of the clip 3 and engaging the nozzle 2, the end of which is preferably rounded, the channel 14 passes between two rollers 4 provided with a peripheral groove, so as to hold both the nozzle 2 and the channel 14 with its bags 15. Said rollers are mounted loosely for free rotation about vertical parallel axes.

The nozzle 2 being thus supported by said rollers, the bag 15a located on the upstream side of said rollers 4 may be filled without any bending of the nozzle. Said filling is obtained through passage of the liquid through the yielding pipe 1, the pipe 10, the nozzle 2 and the port 9 in the latter.

On the downstream side of the carrier rollers 4 is arranged the closing clip constituted chiefly by two electrodes 5 positioned in registry with the neck of the bag 15b which has just been filled and has passed beyond the rollers 4. In the case where the channel 14 and the bags 15 are made of vinyl chloride, the welding electrodes operate with high frequency current. Said electrodes may advantageously carry an engraved indication of the date, so as to provide a dating of the bags simultaneously with their closing.

On the downstream side of the electrodes 5 and in the same transverse plane as the latter is located a cutting system which allows removing the filled and closed bag 15c with reference to the channel 14.

Said cutting system may include, as illustrated in the drawings, two blades 6 similar to razor blades between which the neck of the bag progresses and is cut. It may also be constituted by shears of which the operation is synchronized with that of the closing clip 3 and of the welded portion clip 5. In all cases, the breadth of the welding should be sufficient for the cutting to be executed across the middle of the weld. Thus, the filled and closed bag 15c drops and the channel which is also closed by the weld forms beyond said point a mere tube surrounding the nozzle 2.

As it moves forwardly, said channel engages two slitting blades 7 which are also similar to razor blades and which are positioned to either side of the nozzle 2, so as to shift the channel 14 longitudinally and to transform it into two strips, which allows the nozzle 2 to project laterally out of the split channel and to merge outwardly into the pipe 10. The two blades 7 are mounted on pivotal supports and are drawn towards the nozzle 2 by a tension spring 16.

The two strips obtained through the longitudinal shifting of the channel 14 pass finally over two toothed wheels 8 which ensure the drive of the channel 14 with the bags 15. Said toothed wheels 8 are preferably driven by a motor acting also as a brake. It should be remarked that said toothed wheels act furthermore as draining means by removing the small amounts of liquid which may remain inside the channel 14. Underneath said toothed wheels 8, it is of advantage consequently to position a liquid-recovering vat extending into vertical registry with the blades 7 which produce the longitudinal splitting of the channel 14.

Figure 2:
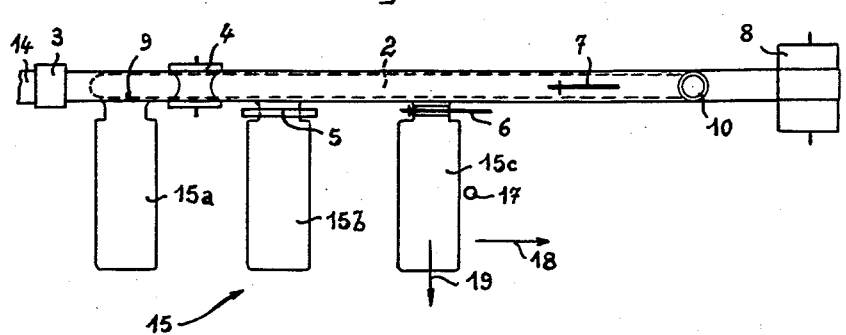
Figure 3:
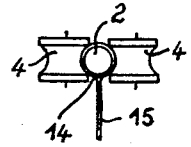
Fig. 3 is a cross-sectional view of a detail through line 3—3 of Fig. 1.

The operation of my improved packaging machine is as follows: the channel 14 and its bags 15 are alternatingly moving and stationary. Their translational shifting is ensured by the above-mentioned toothed wheels 8 which exert a tractional stress on the two strips produced by the longitudinal splitting of the channel 14. Said shifting continues until the bag 15c which has been in succession filled in the position 15a and closed in the position 15b and has reached the location at which it is to be cut off, impinges against a mechanism producing stoppage of the toothed wheels 8. Said mechanism designated by the reference number 17 in Fig. 2 includes for instance a circuit-breaker of micrometric size or a photocell. It should be remarked however that the release of said mechanism need not be ensured, by the impact against it of the bag 15c during its translational shifting in the direction of the arrow 18, but may be as well obtained by the dropping of said bag in the direction of the arrow 19 upon severing of the bag from the channel 14 by the cutting blades 6.

The toothed wheels 8 being thus held fast, the channel 14 and the bags 15 are also stationary. At this moment, the clip 13 opens and the clips 3 and 5 close. This results in a filling of the bag 15a and a closing of the bag 15b. At the same time, the bag 15c is cut off if the cutting means are constituted by shears instead of by the blades 6. During said stage, the duration of filling and thereby the amount of liquid fed into the bag 15a are defined by the time-switch controlling the duration of opening of the clip 13.

When the welding closing the bag 15b and the filling of the bag 15a are completed, the toothed wheels 8 start again rotating. The channel 14 and its bags 15 progress again therefore translationally; a further bag enters the filling area at 15b and the closed bag preceding said prior bag enters the separation area at 15c, and so on.

Obviously, my invention is by no means limited to the embodiment described for the packaging machine and it covers all the modifications thereof falling within the scope of the accompanying claims.

What I claim is:

1. A machine for packaging liquid products inside bags of plastic material opening in parallelism and at equal distances from one another into an elongated liquid-feeding channel, said machine comprising a stationary nozzle provided with a perforation at one end, means for shifting the channel over the nozzle in a direction leading from the perforated end to the opposite end of the nozzle, a clip adapted to engage and close the channel at a point located to the rear of the perforated nozzle end in the direction of progression of the channel over the nozzle, a support engaging the channel to either side of its section engaging the nozzle just beyond the perforation therein, means for longitudinally splitting the channel immediately ahead of the end of its path over the nozzle, welding electrodes lying to either side of the channel at a point registering with a point of the nozzle lying beyond the support for the channel and operating to close the bags by a weld across their upper sections in proximity with the channel, means cutting off the bags through their welded sections at a point lying between said electrodes and the channel splitting means, the spacing between the nozzle perforation and the welding electrodes and between the latter and the cutting means being both equal to the spacing between the bags on the channel, and means for feeding the liquid to be packaged into the end of the nozzle opposed to the perforated end and through the nozzle out of the perforation in said nozzle into the bag opening into the channel at a point in registry with said perforation.

2. A machine for packaging liquid products inside bags of plastic material opening in parallelism and at equal distances from one another into an elongated liquid-feeding channel, said machine comprising a stationary nozzle provided with a perforation at one end, means for shifting intermittently the channel over the nozzle in a direction leading from the perforated end to the opposite end of the nozzle, a clip adapted to engage and close the channel at a point located to the rear of the perforated nozzle end in the direction of progression of the channel over the nozzle, a support engaging the channel to either side of its section engaging the nozzle just beyond the perforation therein, means for longitudinally splitting the channel immediately ahead of the end of its path over the nozzle, welding electrodes lying to either side of the channel at a point registering with a point of the nozzle lying beyond the support for the channel and operating to close the bags by a weld across their upper sections in proximity with the channel, means cutting off the bags through their welded sections at a point lying between said electrodes and the channel splitting means, the spacing between the nozzle perforation and the welding electrodes and between the latter and the cutting means being both equal to the spacing between the bags on the channel, means for feeding the liquid to be packaged into the end of the nozzle opposed to the perforated end and/through the nozzle out of the perforation in said nozzle into the bag opening into the channel at a point in registry with said perforation, and means controlling during each stoppage between the intermittent movements of the channel the operation of the liquid-feeding means and of the welding electrodes.

3. A machine for packaging liquid products inside bags of plastic material opening in parallelism and at equal distances from one another into an elongated liquid-feeding channel, said machine comprising a stationary nozzle provided with a perforation at one end, means for shifting the channel over the nozzle in a direction leading from the perforated end to the opposite end of the nozzle, a clip adapted to engage and close the channel at a point located to the rear of the perforated nozzle end in the direction of progression of the channel over the nozzle, a support engaging the channel to either side of its section engaging the nozzle just beyond the perforation therein, means for longitudinally splitting the channel immediately ahead of the end of its path over the nozzle, welding electrodes lying to either side of the channel at a point registering with a point of the nozzle lying beyond the support for the channel and operating to close the bags by a weld across their upper sections in proximity with the channel, means cutting off the bags through their welded sections at a point lying between said electrodes and the channel splitting means, the spacing between the nozzle perforation and the welding electrodes and between the latter and the cutting means being both equal to the spacing between the bags on the channel, a tube into which the nozzle opens at a point lying ahead of the splitting means, said tube extending at an angle with the nozzle, and means feeding the liquid to be packaged through said tube into the nozzle and through said nozzle into the bag opening into the channel at a point registering with the nozzle perforation.

4. A machine for packaging liquid products inside bags of plastic material opening in parallelism and at equal distances from one another into an elongated liquid-feeding channel, said machine comprising a stationary nozzle provided with a perforation at one end, means for shifting the channel over the nozzle in a direction leading from the perforated end to the opposite end of the nozzle, a clip adapted to engage and close the channel at a point located to the rear of the perforated nozzle end in the direction of progression of the channel over the nozzle, two grooved rollers engaging the channel at diametrically opposed points thereof registering with the nozzle beyond the perforated end of the latter to hold said channel fast over the nozzle, means for longitudinally splitting the channel immediately ahead of the end of its path over the nozzle, welding electrodes lying to either side of the channel at a point registering with a point of the nozzle lying beyond the rollers for the channel and operating to close the bags by a weld across their upper sections in proximity with the channel, means cutting off the bags through their welded sections at a point lying between said electrodes and the channel splitting means, the spacing between the nozzle perforation and the welding electrodes and between the latter and the cutting means being both equal to the spacing between the bags on the channel, and means for feeding the liquid to be packaged into the end of the nozzle opposed to the perforated end and through the nozzle out of the perforation in said nozzle into the bag opening into the channel at a point in registry with said perforation.

5. A machine for packaging liquid products inside bags of plastic material opening in parallelism and at equal distances from one another into an elongated liquid-feeding channel, said machine comprising a stationary nozzle having a rounded forward end provided with a downwardly directed perforation, means for shifting the channel over the nozzle in a direction leading from the perforated end to the opposite end of the nozzle, a clip adapted to engage and close the channel at a point located to the rear of the perforated nozzle end in the direction of progression of the channel over the nozzle, a support engaging the channel to either side of its section engaging the nozzle just beyond the perforation therein, means for longitudinally splitting the channel immediately ahead of the end of its path over the nozzle, welding electrodes lying to either side of the channel at a point registering with a point of the nozzle lying beyond the support for the channel and operating to close the bags by a weld across their upper sections in proximity with the channel, means cutting off the bags through their welded sections at a point lying between said electrodes and the channel splitting means, the spacing between the nozzle perforation and the welding electrodes and between the latter and the cutting means being both equal to the spacing between the bags on the channel, and means for feeding the liquid to be packaged into the end of the nozzle opposed to the perforated end and through the nozzle out of the perforation in said nozzle into the bag opening into the channel at a point in registry with said perforation.

6. A machine for packaging liquid products inside bags of plastic material opening in parallelism and at equal distances from one another into an elongated liquid-feeding channel, said machine comprising a stationary nozzle provided with a perforation at one end, means for shifting the channel over the nozzle in a direction leading from the perforated end to the opposite end of the nozzle, a clip adapted to engage and close the channel at a point located to the rear of the perforated nozzle end in the direction of progression of the channel over the nozzle, a support engaging the channel to either side of its section engaging the nozzle just beyond the perforation therein, two blades for longitudinally splitting the channel immediately ahead of the end of its path over the nozzle, welding electrodes lying to either side of the channel at a point registering with a point of the nozzle lying beyond the support for the channel and operating to close the bags by a weld across their upper sections in proximity with the channel, means for cutting off the bags through their welded sections at a point lying between said electrodes and/the channel splitting means, a spring urging said blades into contact with the channel over the nozzle, the spacing between the nozzle perforation and the welding electrodes and between the latter and the cutting means being both equal to the spacing between the bags on the channel, and means for feeding the liquid to be packaged into the end of the nozzle opposed to the perforated end and through the nozzle out of the perforation in said nozzle into the bag opening into the channel at a point in registry with said perforation.

7. A machine for packaging liquid products inside bags of plastic material opening in parallelism and at equal distances from one another into an elongated liquid-feeding channel, said machine comprising a stationary nozzle provided with a perforation at one end, means for shifting the channel over the nozzle in a direction leading from the perforated end to the opposite end of the nozzle, a clip adapted to engage and close the channel at a point located to the rear of the perforated nozzle end in the direction of progression of the channel over the nozzle, a support engaging the channel to either side of its section engaging the nozzle just beyond the perforation therein, means for longitudinally splitting the channel immediately ahead of the end of its path over the nozzle, means for winding the strips formed by the splitting of the channel to form two spools therewith, welding electrodes lying to either side of the channel at a point registering with a point of the nozzle lying beyond the support for the channel and operating to close the bags by a weld across their upper sections in proximity with the channel, means cutting off the bags through their welded sections at a point lying between said electrodes and the channel splitting means, the spacing between the nozzle perforation and the welding electrodes and between the latter and the cutting means being both equal to the spacing between the bags on the channel, and means for feeding the liquid to be packaged into the end of the nozzle opposed to the perforated end and through the nozzle out of the perforation in said nozzle into the bag opening into the channel at a point in registry with said perforation.

8. A machine for packaging liquid products inside bags of plastic material opening in parallelism and at equal distances from one another into an elongated liquid-feeding channel, said machine comprising a stationary nozzle provided with a perforation at one end, means for shafting the channel over the nozzle in a direction leading from the perforated end to the opposite end of the nozzle, a clip adapted to engage and close the channel at a point located to the rear of the perforated nozzle end in the direction of progression of the channel over the nozzle, a support engaging the channel to either side of its section engaging the nozzle just beyond the perforation therein, means for longitudinally splitting the channel immediately ahead of the end of its path over the nozzle, welding electrodes lying to either side of the channel at a point registering with a point of the nozzle lying beyond the support for the channel and operating to close the bags by a weld across their upper sections in proximity with the channel, two blades positioned to either side of the path followed by the welded sections of the bags for cutting off the bags through their welded sections at a point lying between said electrodes and the channel splitting means, the spacing between the nozzle perforation and the welding electrodes and between the latter and the blades being both equal to the spacing between the bags on the channel, and means for feeding the liquid to be packaged into the end of the nozzle opposed to the perforated end and through the nozzle out of the perforation in said nozzle into the bag opening into the channel at a point in registry with said perforation.

References Cited in the file of this patent

FOREIGN PATENTS 62,989     France _____ Feb. 23, 1955